UNITED STATES PATENT OFFICE.

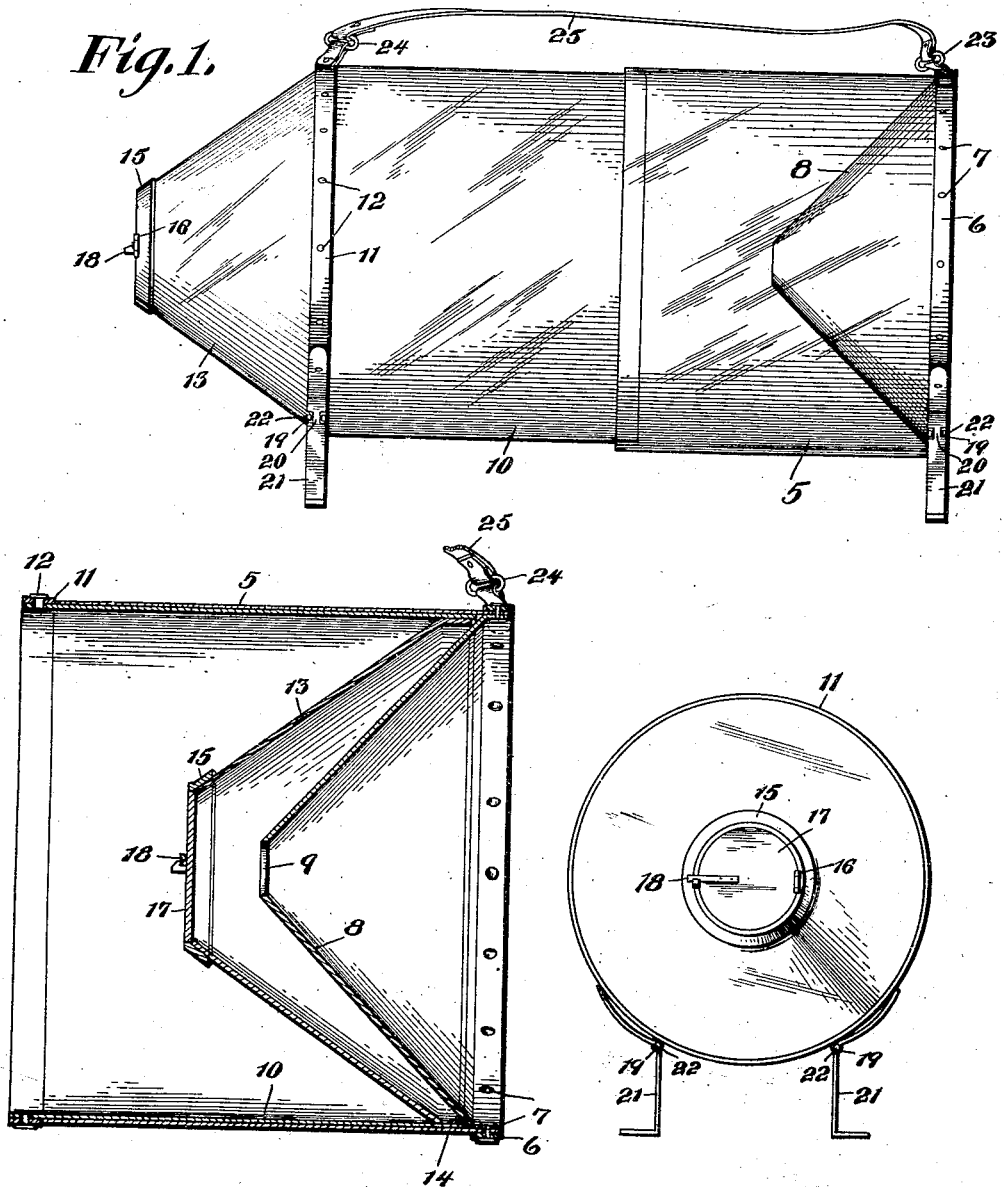

JAMES E. LOGSDON, OF JOPLIN, MISSOURI.

MINNOW-TRAP.

1,269,623.  Specification of Letters Patent.  Patented June 18, 1918.

Application filed April 18, 1916. Serial No. 91,919.

*To all whom it may concern:*

Be it known that I, JAMES E. LOGSDON, a citizen of the United States, residing at Joplin, in the county of Jasper and State of Missouri, have invented certain new and useful Improvements in Minnow-Traps, of which the following is a specification.

My invention relates broadly to traps for catching and holding minnows or the like, and has particular reference to improvements in a trap of this character, which is formed in parts which may be readily collapsed and distended.

An important object of the invention is to provide a trap of the above mentioned character, which is substantially water-tight, when in the distended condition, whereby it will not bruise or injure the caught minnows, upon the trap being removed from the water, and the minnows may be kept alive within the trap for a prolonged period.

A further object of the invention is to provide a trap of the above mentioned character, which will not frighten the minnows when approaching the same.

A further object of the invention is to provide a trap of the above mentioned character, which is simple in construction, cheap to manufacture, and convenient in use.

Other objects and advantages of the invention will be apparent during the course of the following description.

In the accompanying drawings forming a part of this specification and in which like numerals are employed to designate like parts throughout the same, Figure 1 is a side elevation of the trap, showing its elements distended, Fig. 2 is a central vertical longitudinal sectional view through the same with the parts collapsed, and, Fig. 3 is an end elevation of the same.

In the drawings, wherein for the purpose of illustration is shown a preferred embodiment of my invention, the numeral 5 designates a casing-section, which is preferably cylindrical and is preferably formed of a light transmitting material, such as transparent or translucent pyralin, while other suitable material may be employed for this purpose. The outer end of the casing-section 5 is reinforced and stiffened by means of a metallic band 6, secured thereto by pins or rivets 7. These pins or rivets also secure a cone-shaped end-member 8 to the casing-section 5. This end-member is arranged within the casing-section 5 and decreases in diameter inwardly and is provided with an opening 9, at its reduced end, as shown. This end-member is preferably formed of transparent or translucent pyralin.

The numeral 10 designates a co-acting cylindrical casing-section, having a slightly smaller diameter than the casing-section 5 and fitting snugly therein to form therewith a substantially water-tight joint. The casing-section 10 is adapted to be moved longitudinally within the casing-section 5, to assume distended and collapsed positions, as clearly illustrated in Figs. 1 and 2. The outer end of the casing-section 10 is reinforced by a metallic ring 11, arranged upon the exterior thereof and connected therewith by means of pins or rivets 12 or other suitable means. The casing-section 10 is preferably formed of transparent pyralin.

The outer end of the casing-section 10 is covered by means of a tapered or conical end-member 13, decreasing in diameter outwardly and provided at its inner end with an annular flange 14. This inner flanged end has a smaller diameter than the casing-section 10 and fits snugly therein to form therewith a substantially air-tight joint. The end-member 13 is adapted to move longitudinally within the casing-section 10 to distended and collapsed positions, as clearly indicated in Figs. 1 and 2. As shown in Fig. 2, the end-member 8 is adapted to project into the end member 13, when the elements of the device are collapsed. The outer end of the end-member 13 is provided with an outlet opening, surrounding which is a metallic annular frame 15, rigidly secured thereto by any suitable means and having a water-tight joint with the end-member 13. Having hinged connection with the frame 15, as shown at 16, is a door 17, adapted to be held in a closed position by a latch 18 or other suitable means. The door 17, when closed, has a water-tight connection with its frame 15. The end-member 19 is preferably formed of transparent pyralin.

Secured to the lower portions of the reinforcing rings 6 and 11 are pairs of knuckles 19, between which are arranged eyes 20 formed in legs 21. Pins 22 pass through these knuckles and the eyes in the legs. When these legs are swung outwardly, to the active position, their upper ends contact with the reinforcing rings, as shown in Fig.

3, thus retaining the legs in such position. It is apparent that the legs may be swung inwardly thus assuming a more or less collapsed position. Any suitable means may be employed to pivot the legs 21 to the casing.

Loops or eyes 23 and 24 are attached to the upper portions of the rings 6 and 11 respectively, and have connection with a strap 25. This strap serves, when the casing-sections are collapsed, as means for supporting the same during transportation.

In the use of the apparatus, the casing section 10 is moved to the outer position and the end-member 13 is moved to the outer position, whereby the parts assume the relation shown in Fig. 1. The trap may be now lowered into the water and the minnows will pass therein through the opening 9 into the body portion of the trap. When it is desired to remove the minnows the trap is raised out of the water and the door 18 opened. By having the different parts of the trap to fit substantially water-tight, when the trap is raised out of the water, the minnows still remain in the water and are not bruised or injured prior to their use, and may be kept alive in the trap for a prolonged period.

It is to be understood that the form of my invention herewith shown and described is to be taken as a preferred example of the same, and that various changes in the shape, size, and arrangements of parts may be resorted to without departing from the spirit of the invention or the scope of the subjoined claim.

Having thus described my invention, I claim:

In a minnow trap; a casing-section circular in cross-section and formed of transparent flexible material; a reinforcing ring secured to the outer end only of the casing section whereby the inner end of the casing-section remains flexible; a conical end member formed of transparent flexible material and tapering inwardly and provided at its reduced end with an opening and having its large end arranged inwardly of and adjacent the reinforced end of the casing-section and secured to such reinforced end; a coacting casing-section circular in cross-section and formed of transparent flexible material with its inner end telescoping with the inner end of the first named casing-section; a stiffening ring secured to the outer end only of the second named casing-section whereby the inner end of the casing-section remains flexible; a second conical end member formed of transparent flexible material having its inner end provided with a flange mounted to reciprocate within the second named casing-section and to be moved within the reinforcing ring thereof; feet secured to the lower portions of the reinforcing rings; and a handle attached to the upper portions of the ring.

In testimony whereof I affix my signature in the presence of two witnesses.

JAMES E. LOGSDON.

Witnesses:
W. J. OWEN,
GEORGE V. FARRIS.

Copies of this patent may be obtained for five cents each, by addressing the "Commissioner of Patents, Washington, D. C."